(12) United States Patent
Dabak et al.

(10) Patent No.: US 7,502,591 B2
(45) Date of Patent: Mar. 10, 2009

(54) MULTI-MODE RADIO PICONET/SCATTERNET

(75) Inventors: Anand G. Dabak, Plano, TX (US); Timothy M. Schmidl, Dallas, TX (US); Mohammed Nafie, Giza (EG)

(73) Assignee: Texas Instruments Incorporated, Dallas, TX (US)

( * ) Notice: Subject to any disclaimer, the term of this patent is extended or adjusted under 35 U.S.C. 154(b) by 1457 days.

(21) Appl. No.: 09/942,192

(22) Filed: Aug. 29, 2001

(65) Prior Publication Data

US 2005/0181725 A1    Aug. 18, 2005

Related U.S. Application Data

(60) Provisional application No. 60/228,850, filed on Aug. 29, 2000.

(51) Int. Cl.
*H04B 7/00* (2006.01)
(52) U.S. Cl. .............. 455/41.2; 455/426.1; 455/462; 455/463; 370/328; 370/338
(58) Field of Classification Search ............ 455/41.2, 455/426.1, 462, 463; 370/338, 328
See application file for complete search history.

(56) References Cited

U.S. PATENT DOCUMENTS

| | | | |
|---|---|---|---|
| 6,326,926 B1 * | 12/2001 | Shoobridge et al. | 343/702 |
| 6,452,910 B1 * | 9/2002 | Vij et al. | 370/310 |
| 6,519,460 B1 * | 2/2003 | Haartsen | 455/452.1 |
| 6,650,871 B1 * | 11/2003 | Cannon et al. | 455/41.2 |
| 6,760,319 B1 * | 7/2004 | Gerten et al. | 370/335 |
| 6,766,160 B1 * | 7/2004 | Lemilainen et al. | 455/411 |
| 6,975,613 B1 * | 12/2005 | Johansson | 370/338 |
| 7,039,358 B1 * | 5/2006 | Shellhammer et al. | 455/41.2 |
| 7,114,010 B2 * | 9/2006 | Karaoguz et al. | 709/250 |
| 2002/0065099 A1 * | 5/2002 | Bjorndahl | 455/553 |
| 2002/0120569 A1 * | 8/2002 | Day | 705/40 |

* cited by examiner

*Primary Examiner*—Tuan A Pham
(74) *Attorney, Agent, or Firm*—Ronald O. Neerings; Wade James Brady, III; Frederick J. Telecky, Jr.

(57) ABSTRACT

A communication system 100 allows for heterogeneous piconets/scattenets 100 where in multiple modes 110, 112 of transmission, one of Bluetooth 110 and one or more other modes of transmission 112 are possible. While at the same time maintaining synchronization between all the different modes of transmission 110, 112 in a given piconet and across a scatternet 100. This allows for a communication device that can communicate using a plurality of transmission modes depending on the communication needs of the device.

20 Claims, 3 Drawing Sheets

MULTI-MODE RADIO PICONET/SCATTERNET

CROSS-REFERENCE TO RELATED APPLICATIONS

This application claims the benefit of U.S. Provisional Application No. 60/228,850, entitled "Multi-mode, multimedia piconets/scatternets", having, and filed on Aug. 29, 2000.

TECHNICAL FIELD

This invention relates in general to the field of radio communications, and more specifically to a multi-mode radio frequency network.

BACKGROUND

Previous communication systems allow for communication between different devices using a single mode of transmission. For example, a device communicating to other electronic devices over a Bluetooth piconet or scatternet (Bluetooth is a protocol for wireless communications over short distances developed by the Bluetooth Special Interest Group), or a portable computer communicating to a computer network using an Institute of Electrical and Electronic Engineers (IEEE) 802.11 (a or b) protocol, etc. Given the increased use of wireless communications in many everyday electronic devices (e.g., personal digital assistants (PDAs, portable computers, etc.) and the increased number of different communication protocols being used, a need exists in the art for a method and system which would allow a Bluetooth compliant device to be able to communicate using one or more other modes of communications, thereby allowing the device to communicate to some devices using the Bluetooth protocol, while communicating with other device(s) or the same device using another protocol, such as a higher speed IEEE 802.11 protocol or any one of a number of other communication protocols.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
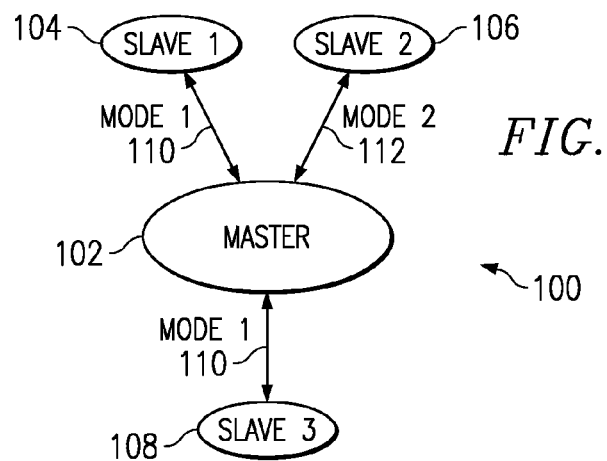
FIG. 1 shows a diagram of a multi-mode radio communication network in accordance with the invention.

While the specification concludes with claims defining the features of the invention that are regarded as novel, it is believed that the invention will be better understood from a consideration of the following description in conjunction with the drawing figures.

The present invention provides for a heterogeneous radio network where a master unit communicates using voice or data to a first group of slave units in a first mode of operation, such as a Bluetooth mode, and communicates to a second group of slave units in a second mode, such as an IEEE 802.11 (a or b) protocol, etc. The master unit maintains synchronization with the slave units in the first mode and periodically communicates with them while at the same time servicing slave units using the second mode of operation. The second communication protocol beside the Bluetooth protocol that can be used by the device in accordance with the invention can include for example the IEEE 802.11 protocol as mentioned previously, High Rate Bluetooth protocol, the Global System of Mobile Communications (GSM) protocol, General Packet Radio Service (GPRS), Wideband Code Division Multiple Access (W-CDMA) protocol, other wireless local area network communication protocols, etc., but is not limited to these protocols. The present invention teaches a technique whereby a device can synchronize its communications using the Bluetooth protocol and one or more other protocols in order to increase the usefulness of the device in question.

Figure 2:
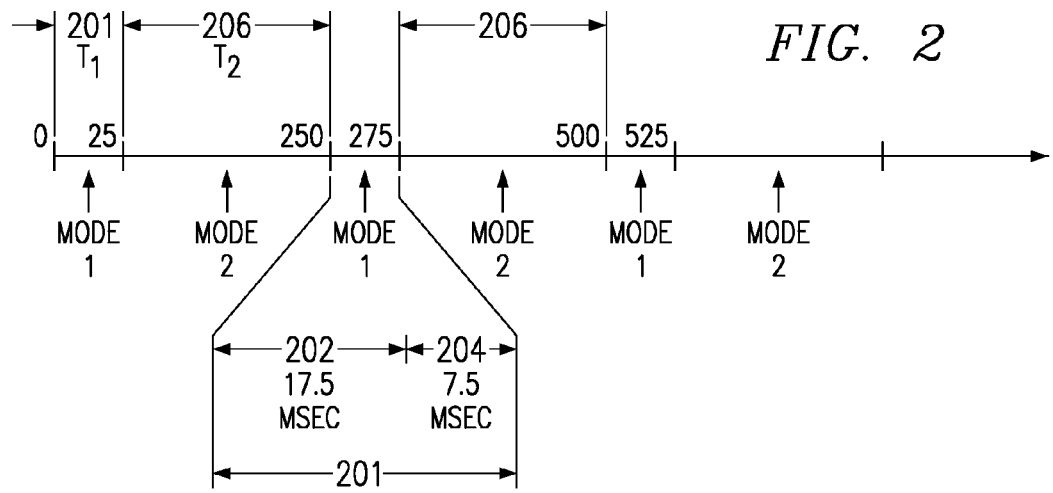
FIG. 2 shows a time line of a master unit communicating to a first group of slave units using a first mode and to a second group of slave units using a second mode of communications.

In FIG. 1 there is shown a system diagram of a radio network 100 in accordance with the invention. Radio network 100 includes a master unit 102 that communicates with two slave units 104, 108 using a first mode of communications (Mode 1), such as via a Bluetooth piconet 110, and is also able to communicate with a slave unit 106 using a second mode of operation (Mode 2) such as using an 802.11 protocol. Likewise in accordance with the invention, slave units can simultaneously exchange voice/data in a scatternet wherein one or more piconets in the scatternet are Bluetooth piconets (mode 1) and one or more piconets use a different mode of communication (mode 2) with master 102. In FIG. 2, a time line showing an illustrative example of time slots in which the master unit 102 communicates in mode 1 (Bluetooth mode) during time slots 201, and in the IEEE 802.11 mode 2 during time slots 206 (or using any one of a number of other communication protocols) is shown. The mode 1 time slots 201 are further broken down into time periods 202 and 204. In time period 202, the Master 102 communicates with other Bluetooth devices such as slave units 104, 108 using Bluetooth paging, sniff, beacon, etc. modes. In time period 204, the master unit 102 selects a good 22 MHz band using the Bluetooth probe, listen and select functions. In time period 206, the master unit 102 communicates with salve unit 106 using the second mode of communication, for example, 802.11.

Figure 3:
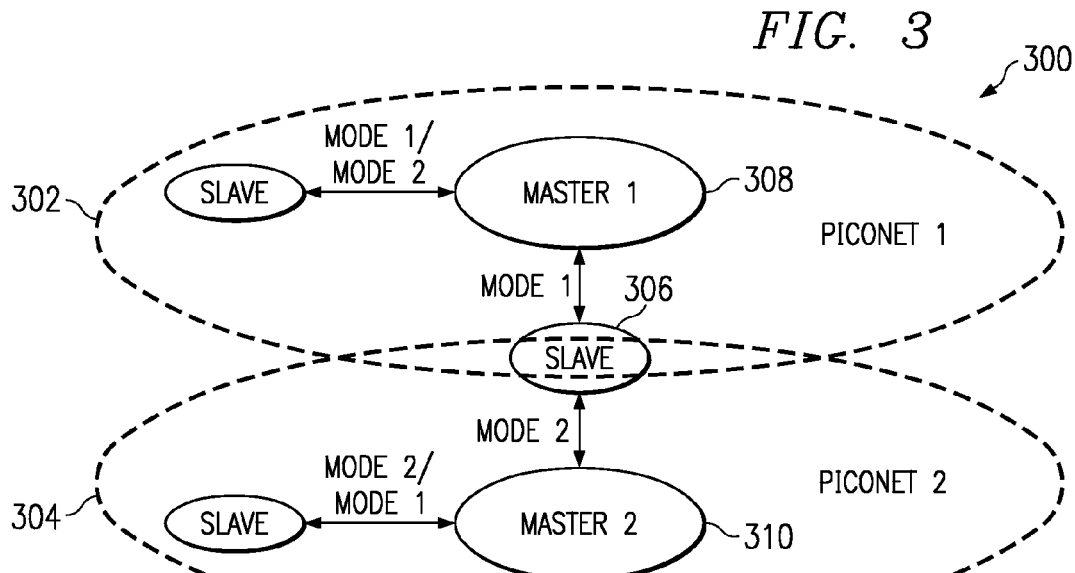
FIG. 3 shows a scatternet wherein a slave unit communicates to a master unit located in a first piconet using a first mode of transmission, and to a second master unit located in a second piconet using a second mode of transmission in accordance with the invention.

In accordance with the invention, slave units can be simultaneously exchanging voice or data in a scatternet wherein one piconet is a Bluetooth piconet (mode 1) and the other piconet is a higher speed mode of operation (mode 2). Referring to FIG. 3, there is shown a scatternet 300 comprising two piconets 302 and 304. In this scenario, a slave unit 306 communicates to a first master unit 308 in bluetooth mode (Mode 1) that is in the first piconet 302, and also communicates with a second master unit 310 that is operating in a second piconet 304. Other combination of the above scenario where a slave unit communicates to multiple piconets that are themselves multi-mode piconets are also possible.

Figure 4:
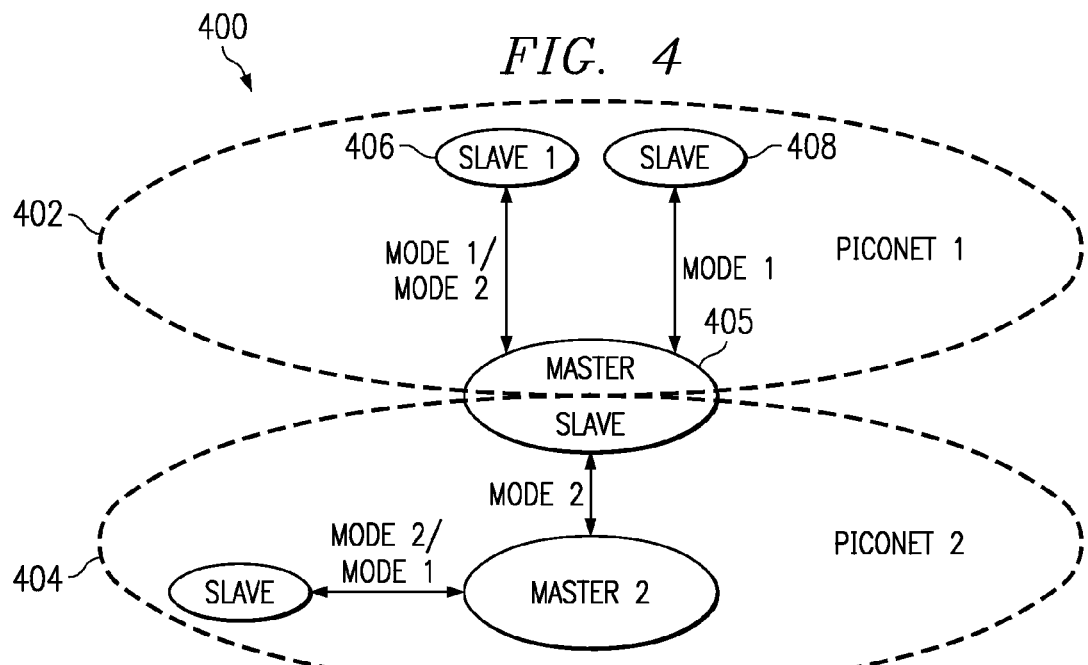
FIG. 4 shows a scatternet wherein a device acts as a master in one piconet and as a slave unit in a second piconet in accordance with the invention.

In still a further embodiment, in FIG. 4 there is shown a master unit 405 that can be communicating to one or more slave units 406, 408 in a first piconet 402 using Bluetooth and another communication protocol (Mode 2), and at the same time function as a slave unit in a second piconet 404. In this scenario, device 406 acts as a Master in one piconet 402, and a slave unit in a second piconet 404, while communication using multiple modes.

As has been shown above, the present invention provides for a device that can communicate not only using Bluetooth but also using one or more other modes of communications. As shown above, this multi-mode capability can be used across piconets and scatternets. Synchronization between all the different modes of transmission is maintained in a given piconet and across a scatternet comprising multiple piconets.

Figure 5:
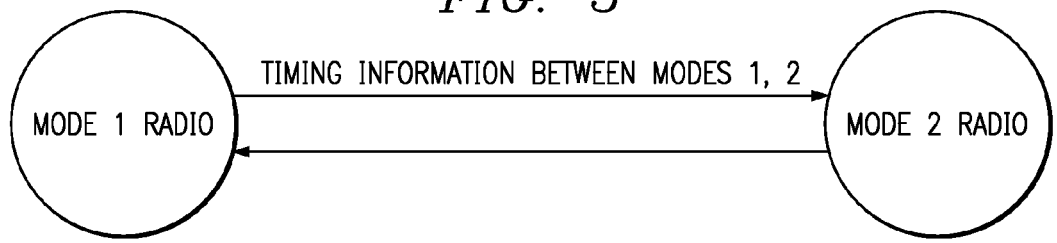
FIG. 5 is a diagram highlighting timing synchronization between two modes in accordance with the invention.
Figure 6:
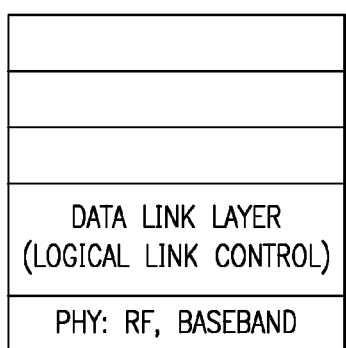
FIG. 6 shows how synchronization between two modes is maintained at the physical layer in accordance with the invention.
Figure 6:
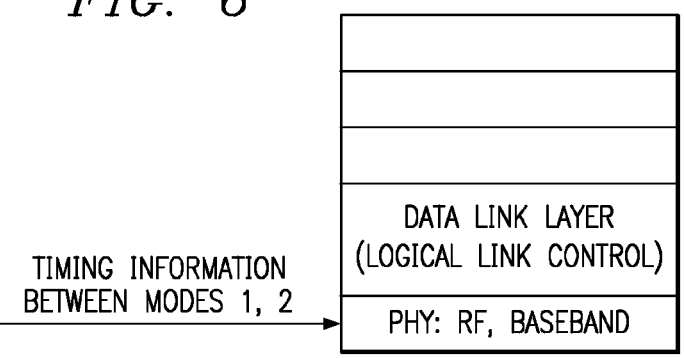

The synchronization between the different modes within a device is maintained as shown in FIG. 5. With the timing information in the device being shared in the multiple modes of communication. The timing information synchronization is maintained explicitly at the physical (PHY) layer to allow rapid mode switching within the piconet as shown in FIG. 6.

Figure 7:
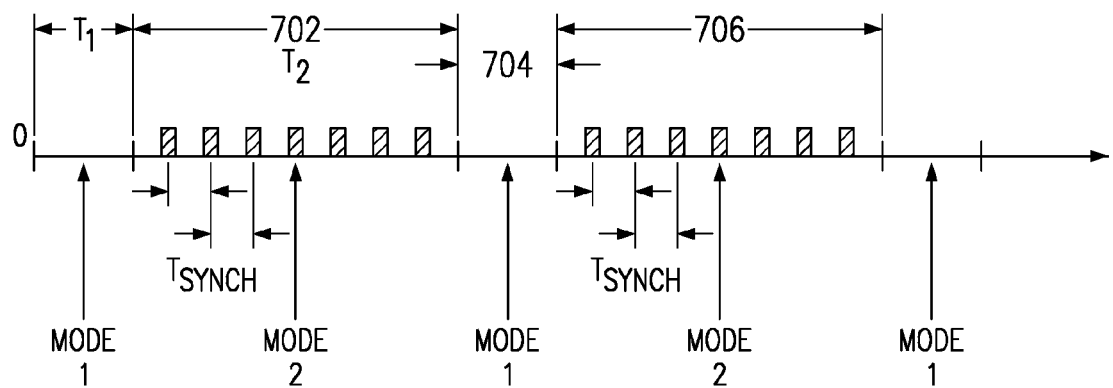
FIG. 7 shows a timing diagram highlighting "within mode" synchronization in accordance with the invention.

Regarding synchronization, synchronization packets in mode 2 (non-Bluetooth mode) can be "within mode synchronous", i.e., synchronous only in mode 2, and they stop when the master enters mode 1. Within mode synchronous is shown in FIG. 7, with synchronous packets occurring at time periods 702 and 706 while in mode 2, and no packets occurring in time period 704 while in the Bluetooth mode (mode 1).

Figure 8:
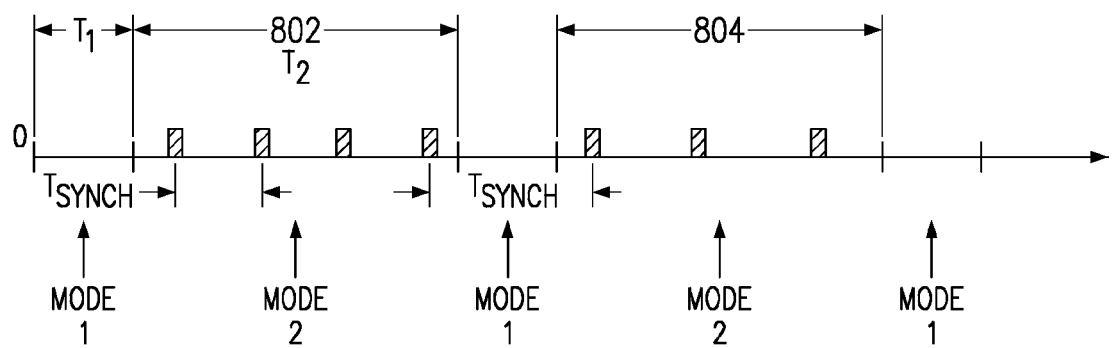
FIG. 8 shows a timing diagram highlighting "across mode" synchronization in accordance with the invention.

Synchronization packets in mode 2 can also be "across modes synchronous" when the time between packets is larger than the time the master spends in mode 1 (Bluetooth mode). The same can be applied for synchronous packets in mode 1. In FIG. 8, there is shown a time line highlighting "across mode synchronous packets". Synchronous packets occur in time periods 802 and 804.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A piconet, comprising:
   first and second communication devices,
   the first communication device communicating with the second communication device using a Bluetooth mode of transmission and a second mode of transmission,
   wherein each of said first and second communication devices is selectable as a master device that coordinates synchronization for communications in the Bluetooth mode and communications in the second mode,
   wherein each of said first and second communication devices is selectable as a slave device that adheres to the synchronization provided by the master device.

2. A piconet as defined in claim 1, wherein the second mode of transmission is a higher speed mode than the Bluetooth mode.

3. A piconet as defined in claim 1, wherein the first communication device maintains synchronization between the Bluetooth mode and the second mode at the physical layer.

4. A piconet as defined in claim 1, wherein the first communication device is a master unit.

5. A scatternet, comprising:
   a first piconet having a first communication device operating therein;
   a second piconet having a second communication device operating therein; and
   a third communication device, enabled to communicate in the first piconet and the second piconet, communicating to the first communication device using a Bluetooth mode, and communicating to the second communication device using a second mode of transmission, and wherein synchronization between the Bluetooth mode and the second mode is maintained in the third communication device to selectively enable the first and second communication devices to communicate with each other via the third communication device.

6. A scatternet as defined in claim 5, wherein the third communication device selectively comprises a slave unit.

7. A scatternet as defined in claim 6, wherein the first and second communication devices selectively comprise master units.

8. A scatternet as defined in claim 5, wherein the third communication device selectively comprises a device which acts as a master unit when communicating with the first communication device and acts as a slave unit when communicating with the second communication device.

9. A scatternet as defined in claim 5, wherein synchronization between the Bluetooth mode and the second mode is selectively maintained in the third communication device at the physical layer of the Bluetooth mode and the second mode.

10. A method for communicating between a first communication device and a plurality of other communication devices using multiple modes including a Bluetooth mode of operation, the first communication device being enabled to communicate in a first piconet and a second piconet, the method comprising the steps of:
    (a) placing the first communication device in the Bluetooth mode in order to communicate with a communication device from amongst the plurality of communication devices in the first piconet;
    (b) placing the first communication device in a second mode in order to communicate with a communication device from amongst the plurality of communication devices in the second piconet, the second mode being the mode used by the plurality of communication devices in the second piconet; and
    (c) synchronizing the Bluetooth mode and the second mode of the first communication device to selectively enable devices in the first and second piconets to exchange data.

11. A method as defined in claim 10, wherein the first communication device in step (b) uses a "within mode synchronous" technique while in the second mode whereby the packets used to communicate with the communication device from amongst the plurality are only synchronous while the first communication device is in the second mode.

12. A method as defined in claim 10, wherein the first communication device uses packets to communicate with the communication devices in step (a) and (b) which are "across mode synchronous".

13. A method as defined in claim 10, wherein the communication device that the first communication device communicates with in step (a) and (b) is the same communication device from amongst the plurality of communication devices.

14. A piconet as defined in claim 1, wherein the second communication device is a slave unit.

15. A scatternet as defined in claim 5, wherein the third communication device is a slave unit.

16. A scatternet as defined in claim 15, wherein the first communication device is a master unit.

17. A scatternet as defined in claim 15, wherein the second communication device is a master unit.

18. A scatternet as defined in claim 5, wherein the third communication device is a slave unit while communicating in the first piconet and is a master unit while communicating in the second piconet.

19. A scatternet as defined in claim 18, wherein the first communication device is a master unit.

20. A scatternet as defined in claim 18, wherein the second communication device is a slave unit.

* * * * *